April 11, 1967   H. W. SUTTLE ETAL   3,313,448
SIGNALLING CAN DISPENSER
Filed July 17, 1964   5 Sheets-Sheet 2

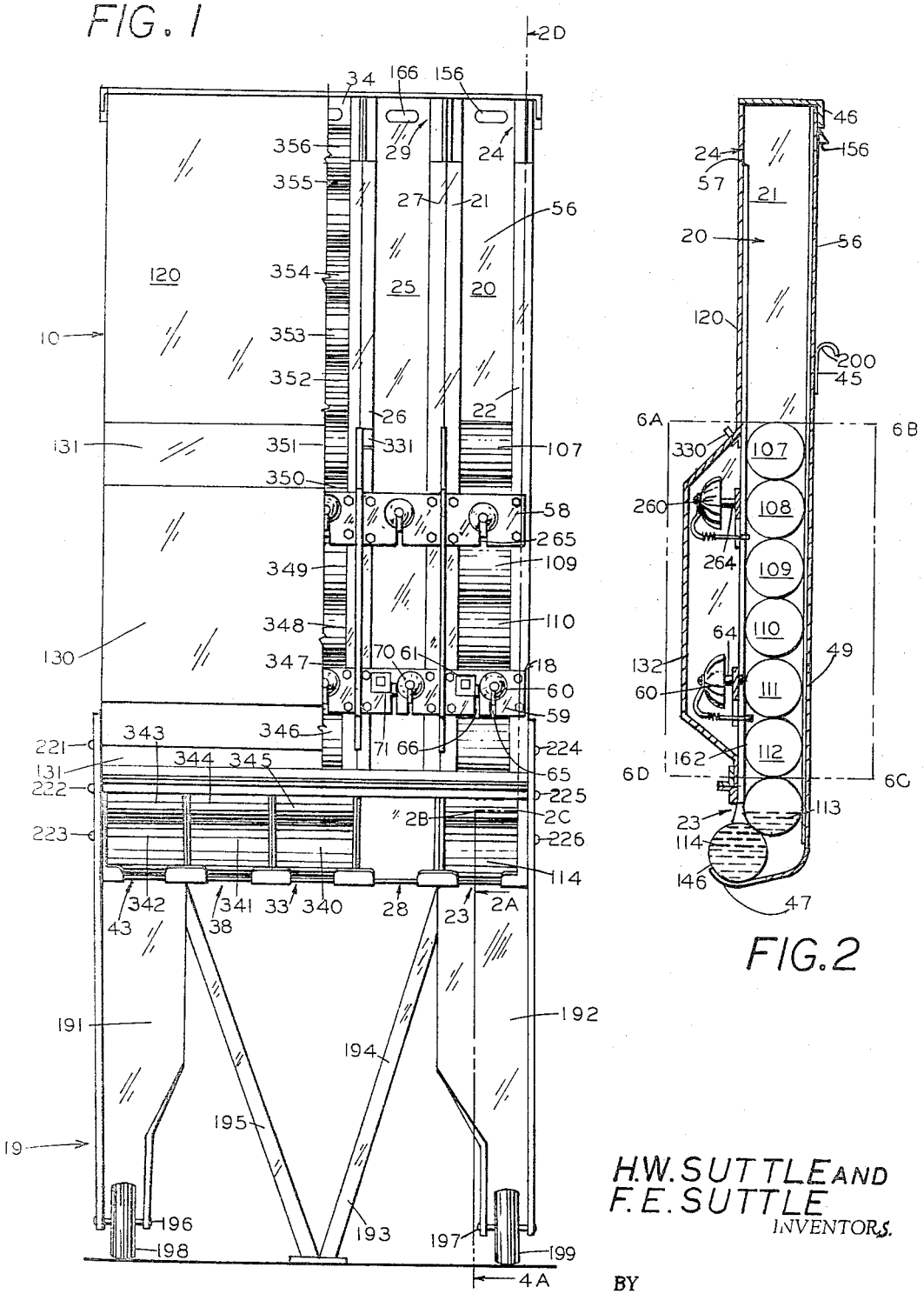

H.W. SUTTLE AND
F. E. SUTTLE
INVENTORS.

BY
Ely Silverman
ATTORNEY

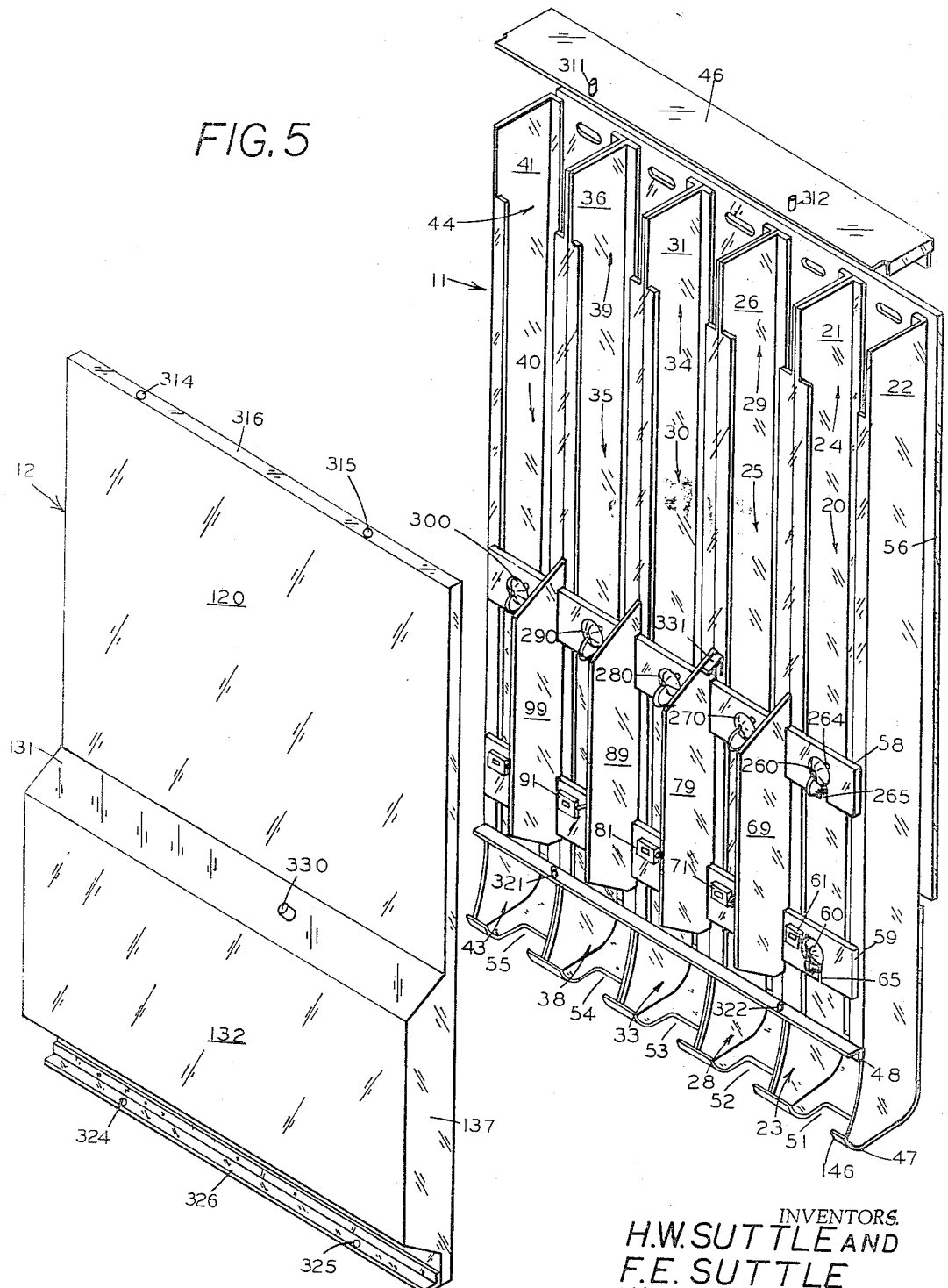

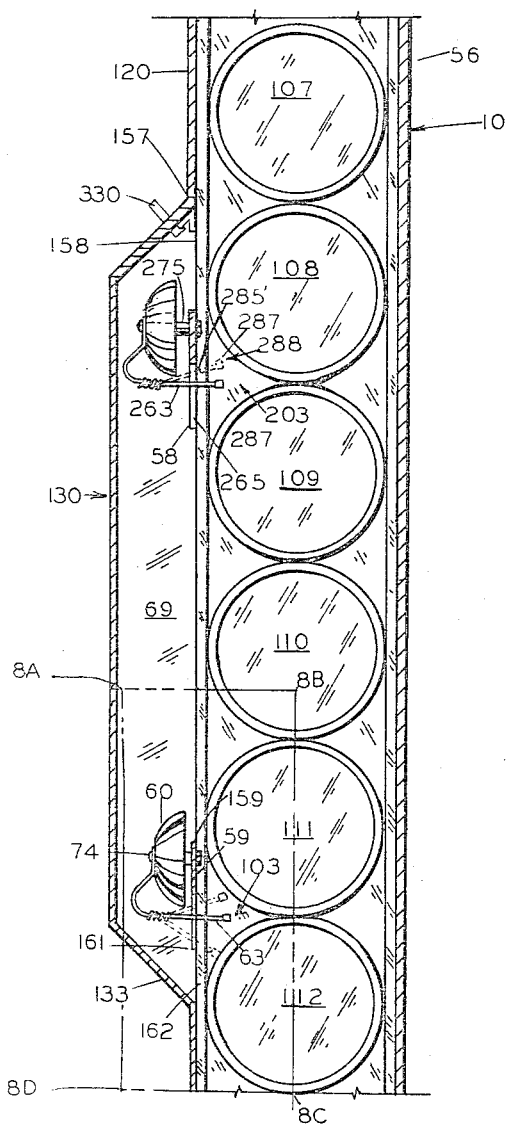
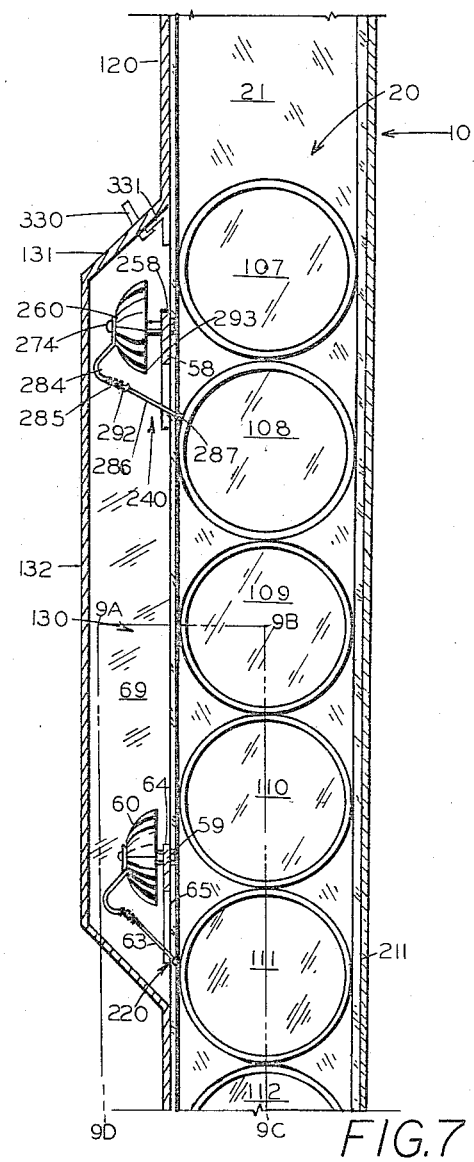

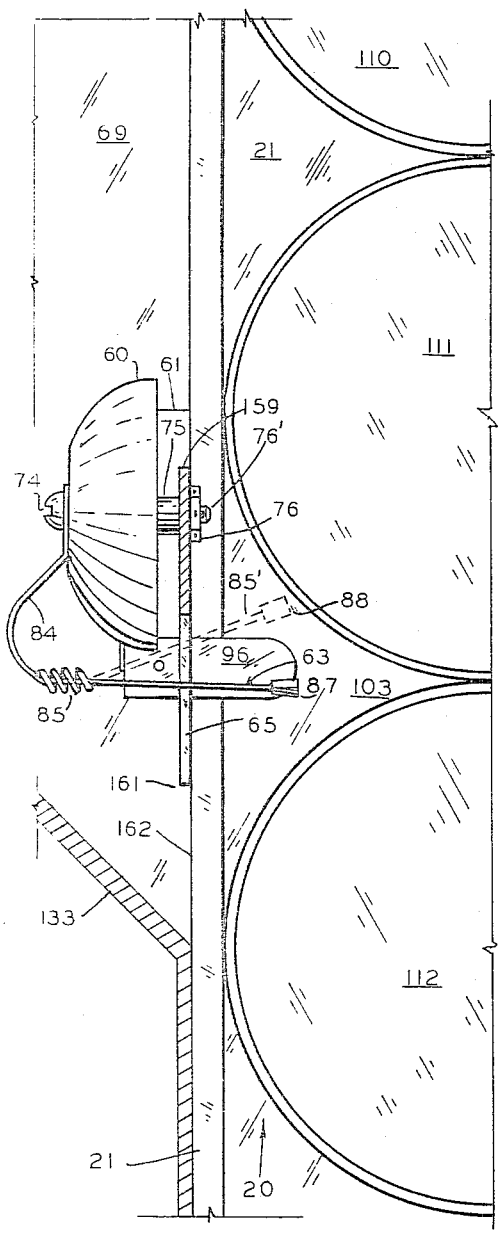
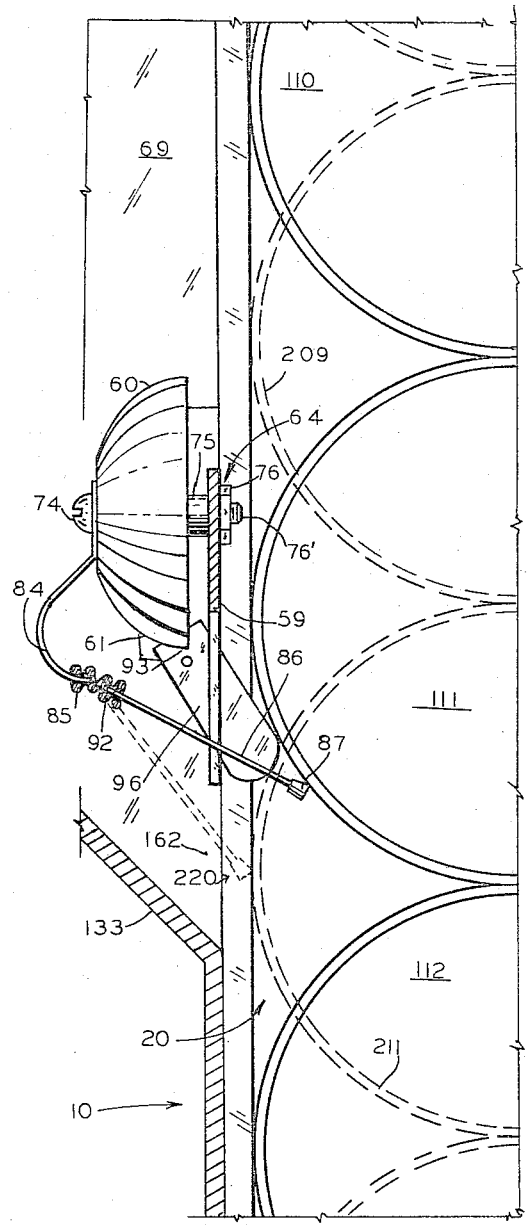

United States Patent Office 3,313,448
Patented Apr. 11, 1967

3,313,448
SIGNALLING CAN DISPENSER
Howard Wayne Suttle, 3622 Ong St., Amarillo, Tex. 79110, and Freelin Eugene Suttle, 2700 4th Ave., Canyon, Tex. 79015
Filed July 17, 1964, Ser. No. 383,428
6 Claims. (Cl. 221—3)

This invention relates to a metering and alarm dispenser for cylindrical objects such as cans. It is designed in particular to aid automotive, gasoline and service station operators in the inventory control of their stock in cylindrical cans such as oil cans.

Generally, service station operators have had a continuing problem with pilfering of stocks by employees as well as by transients through service stations. In maintaining stocks in dispensing containers that are transparent and the contents of which are visible to the customer and to the owner, container walls of glass crack and break while transparent plastics craze and achieve an undesirable appearance, while slotted containers with slots sufficiently large to permit external visual inspection of the contents of the containers open to the public invite the deposit of dust and trash therein.

It is one object of this invention to provide a sturdy metering dispenser which registers an audible signal every time a can passes therefrom in order to make a record thereof and to alert the service station or other operator or attendant or owner such merchandise is being taken, either with or without authorization.

A further object of this invention is to provide an assembly of dispensing containers, each of which provides a characteristic audible signal depending upon the degree of fullness thereof.

Other objects of this invention are to provide a dispenser which indicates to an operator-owner at a distance from that dispenser the inventory condition of the dispenser and which is easy to keep clean and provides an unbroken space for decals.

Yet another object of this invention is to provide a mobile dispensing and signalling apparatus which can be placed at any location to suit the owner-operator and does not require electrical outlets or batteries.

Other objects and advantages of this invention will be apparent to those skilled in the art on the study of the below specification of which specification the drawings annexed hereto form a part, and wherein like numbers refer to the same structure throughout and wherein FIGURE 1 is a front view, partly broken away, of one embodiment of apparatus according to this invention.

FIGURE 2 is a vertical cross-sectional view taken along the section 2A–2B–2C–2D of FIGURE 1 and shows the position of parts and supplies therein during the storage of containers in a modification of the apparatus of FIGURE 1 for suspension on a wall;

FIGURE 5 is a perspective and expanded view of the component assemblies of the empty apparatus of FIGURE 2;

FIGURE 6 is an enlarged view of zone 6A–6B–6C–6D of FIGURE 2;

FIGURE 7 is an enlarged view of zone 7A–7B–7C–7D of FIGURE 4 but in a slightly later stage of dispensing;

FIGURE 8 is an enlarged view of zone 8A– 8B– 8C– 8D of FIGURE 6; and

FIGURE 9 is in dashed lines, an enlarged view of zone 9A–9B–9C–9D of FIGURE 7 and, in full lines, a corresponding zone of FIGURE 4.

Figure 3:
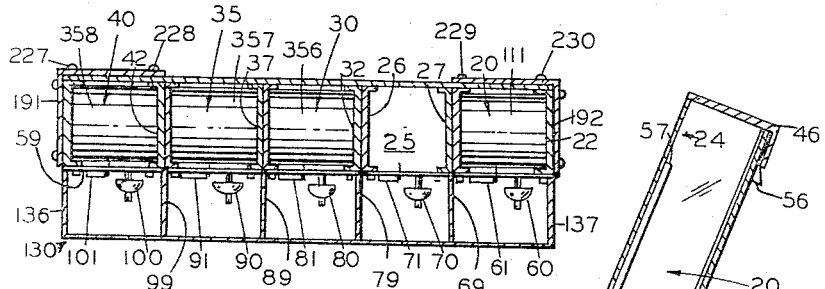
FIGURE 3 is a transverse cross-sectional view taken along the plane shown as 3A–3B in FIGURE 4.
Figure 4:
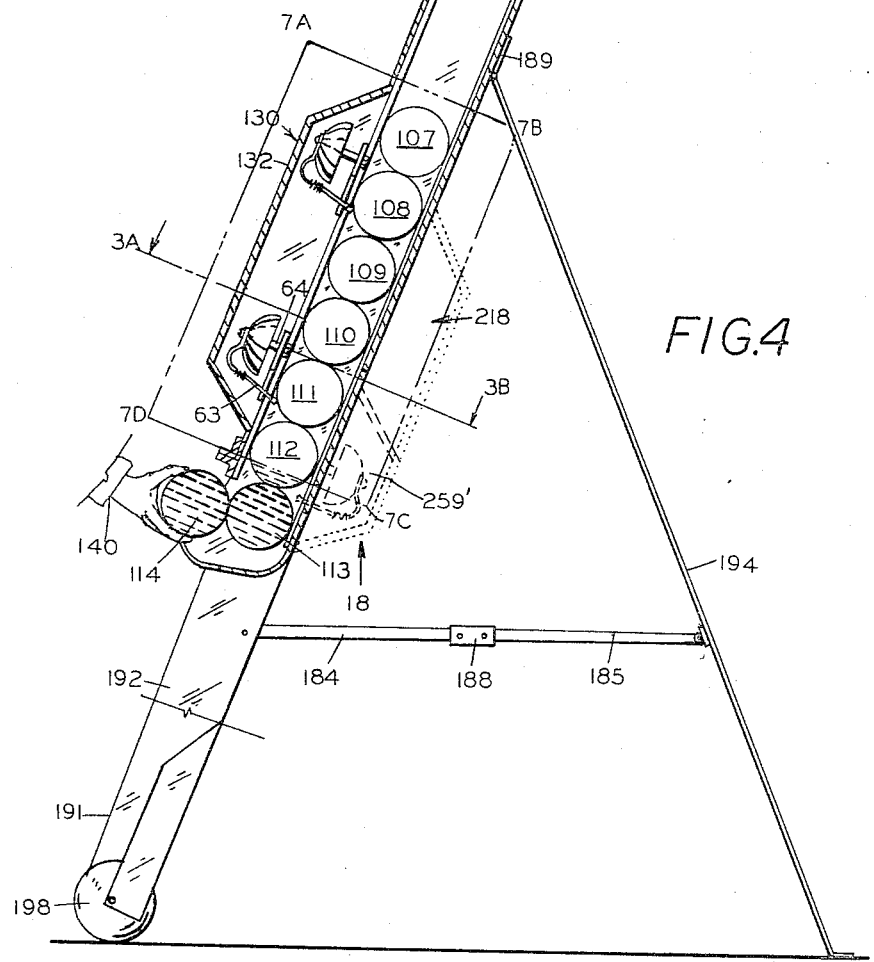
FIGURE 4 is a vertical cross-sectional view along the vertical section 4A–2B–2C–2D in the operative position of parts of the apparatus of FIGURE 1 in the dispensing position of the parts and contents thereof.

The apparatus of the invention generally shown as 10 comprises a guide group subassembly 11, a front cover subassembly 12, a counter and signal subassembly 18, and a support subassembly 19. The front cover subassembly 12 fits on the front of the guide group subassembly 11 and in operative position, as in FIGURES 1, 3 and 4, is firmly attached thereto. A top cover 46 firmly fits on and is attached to the top of the subassembly 11. The counter and signal subassembly 18 is firmly fixed to the front of the guide group subassembly 11 within the counter and signal subassembly chamber shell portion 130 of the cover subassembly 12 when subassembly 12 is in place on the subassembly 11.

The guide group subassembly 11 comprises a plurality of like guide subassembly chambers 20, 25, 30, 35 and 40. Guide subassembly chamber 20 comprises an imperforate left-hand channel 21, an imperforate right-hand channel 22, a portion of the top cover 46, and a position of the front cover 12 and the lower portion 47 of the bottom cover 49 forms the bottom of each of the guide subassemblies 20, 25, 30, 35 and 40, and a portion of the back cover 56 forms a portion of the rear of each of subassemblies 20, 25, 30, 35 and 40.

Subassembly chamber 25 similarly comprises an imperforate left channel 26 and an imperforate right channel 27, and a portion of each of the top covers 46, bottom cover 49, rear cover 56 and front cover 12. Guide subassembly chamber 30 is similarly formed of an imperforate left channel 31 and an imperforate right channel 32, a portion of each of the top covers 46, bottom cover 49 and front cover 12. Guide subassembly chamber 35 is similarly formed of an imperforate left channel 36, an imperforate right channel 37, a portion of each of the top cover, bottom cover, rear cover, and front cover 12. Subassembly chamber 40 is formed of an imperforate left channel 41, an imperforate right channel 42, and a portion of each of the top cover, bottom cover, rear cover, and front cover 12. A back brace 45 firmly joins the flanges of the above-mentioned channels 21, 22, 26, 27, 31, 32, 36, 37, 41 and 42 at their middles and the top cover 46 joins those channels at the tops thereof. The adjacent channels 21 and 27, 26 and 32, 31 and 37, 36 and 42 are firmly attached to each other; these pairs of adjacent channels are all of the same height and shape.

The front edges of the channels 21 and 22 are cut away at their bottom to provide a discharge opening 23 for the chamber 20. Each of the guide subassembly chambers as 20, 25, 30, 35 and 40 have, respectively, similar discharge openings 23, 28, 33, 38 and 43. The bottom portion 47 of bottom cover 49 is cut away at openings 51, 52, 53, 54 and 55 to provide cut away portions for finger space in each of the discharge openings 23, 28, 33, 38 and 43, respectively.

The front portions of the angles 21, 22, 27, 26, 31, 32, 36, 37, 41 and 42 are joined to and held in place by a front brace 48. The bottom of brace 48 forms the top of the front of the discharge openings 23, 28, 33, 38 and 43.

In the guide subassembly chamber 20 the upper portion of the forward web of the U-shaped channel 21 is cut away as is the upper forward edge of the channel 22 to form an inlet opening 24 for chamber 20. The channels for the other guide subassembly chambers are similarly cut away at the top to form inlet openings 29, 34, 39 and 44, similar to 24, for subassembly chambers 25, 30, 35 and 40 respectively. The bottom edge 57 of the inlet opening 24 of the chamber 20 has the same height as the inlet openings 29, 34, 39 and 44 for the chambers 25, 30, 35 and 40.

The counter and signal subassembly 18 comprises a lower bell support plate 59 and an upper bell support plate 58. Plate 59 is a horizontally extending rigid plate firmly attached to the front of each of channels 21, 22, 26, 27, 31, 32, 36, 37, 41 and 42. Plate 59 and plate 58 are each separately vertically adjustable for adjustment of the space therebetween. A space 162 is provided below the lower edge 161 of plate 59 and the lower edge 160 of the chamber shell portion 130. A bell 60 and a counter 61 are mounted side by side on a plate 59 in front of the chamber 20. Corresponding bells 70, 80, 90 and 100 and counters 71, 81, 91 and 101 are respectively mounted similarly in front of the subassemblies 25, 30, 35 and 40.

Plate 58 is a horizontally extending rigid plate firmly attached to the front of each of channels 21, 22, 26, 27, 31, 32, 36, 37, 41 and 42 above and parallel to plate 59. A space 158 is provided above the upper edge 258 of plate 58 and below the upper edge 157 of the counter and signal subassembly chamber shell portion 130 of the cover subassembly 12. A bell 260 is mounted on plate 58 in front of the chamber 20. Corresponding bells 270, 280, 290 and 300 are respectively mounted similarly in front of the chambers 25, 30, 35 and 40.

The cover subassembly 12 comprises a flat, generally imperforate, upper guide subassembly chamber cover portion 120, a counter and signal subassembly chamber shell portion 130 and a left end portion 136 and a right end portion 137.

The cover plate portion 120 is, in operation of the apparatus, releasably yet firmly supported on the flanges of the chambers 25, 30, 35 and 40 above subassembly 18. Chamber shell portion 130, which protects the counter and signal subassembly 18, has an upper forwardly and downwardly sloped portion 131 adjacent to and joined to the flat plate 120, a forward, flat, vertical portion 132 and a lower downwardly and rearwardly sloped portion 133, and covers the front portion of the counter and signal subassembly 18. The lower edge of portion 133 engages with and rests on and is firmly yet releasably attached to the front brace 48 through a flange 326 and pins 324 and 325.

An imperforate plate 69 is located on the front side of plates 59 and 58 opposite to the junction of channels 21 and 27. Plate 69 extends from walls 131, 132 and 133 of shell portion 130 to the junction of channels 21 and 27. Plate 69, the cover shell portion 130, and channels 21 and 27 acoustically seal off chamber 20 from chamber 25.

Imperforate plates 79, 89, 99 and 109 are each firmly located on the front faces of plates 58 and 59 and extend from the walls 131, 132 and 133 of shell portion 130 and acoustically seal off chamber 25 from chamber 30, chamber 30 from chamber 35, and chamber 35 from chamber 40 in the same manner as plate 69 seals off chamber 20 from chamber 25.

The end plate 136 completely acoustically seals the chamber 40 from the exterior of the subassembly 18 and the plate 137 seals chamber 20 from the exterior.

Bell 60 is firmly mounted on a supporting stand 64 therefor. The stand comprises a bolt 74 and a sleeve 75. The shaft 76' of the bolt passes through the sleeve 75 and is firmly attached to plate 59 as by a nut 76. A hammer mounting bracket 84 is mounted on the stand 64. The hammer mounting bracket supports a hammer mounting spring 85: a bell hammer 63 is firmly yet resiliently supported on the spring 85. The hammer comprises a rigid, metallic, solid cylindrical shaft 86 and a hammer head 87 firmly attached thereto.

The plate 59 is provided with a slot 65 for the hammer 63. The hammer shaft extends from its outer end 92 to the hammer 87. The outer end 92 is located vertically below the point of attachment of bracket 84 to bolt 74 and is also located at a level below the vertical level of the bottom edge 93 of the bell 60. The hammer shaft 86 freely passes through vertical slot 65 and hammer head 87 engages the containers, such as 111, 112, 113, 114 as below described.

The arm 96 of the counter 61 passes through a slot 66 to engage the cylinders 111, 112, 113, 114 going therepast at the same time as the hammer 63 engages such cylinders.

Bell 260 is firmly mounted on a supporting stand 264 therefor. The stand comprises a bolt 274 and a sleeve 275, which bolt and sleeve are slightly longer than bolt 74 and sleeve 75. The shaft 276' of the bolt passes through the sleeve 275 and is firmly attached to plate 58, as by a nut 276. A hammer mounting bracket 284 is identical in size and shape to bracket 84 and is similarly mounted on the stand 264. The hammer mounting bracket supports a hammer mounting spring 285 identical to spring 85: a bell hammer 263 identical to hammer 63 is firmly yet resiliently supported on the spring 285. The hammer 263 comprises a rigid, metallic, solid cylindrical shaft 286 and a hammer head 287 identical to head 57 firmly attached thereto. Shaft 286 and 86 are of the same size.

The plate 58 is provided with a slot 265 for the hammer 263. The hammer shaft extends from its outer end 292 to the hammer 287. The outer end 292 is located vertically below the point of attachment of bracket 284 to bolt 274 and is also located at a level below the vertical level of the bottom edge 293 of the bell 260. The hammer shaft 286 freely passes through vertical slot 265 and hammer head 287 engages the containers, such as 107, 108, 109 as below described.

Similar bells 70, 80, 90 and 100 each identical to bell 60 and with identical hammers, hammer brackets, springs, shafts and heads and similar counters 71, 81, 91 and 101 identical to counter 61 are each similarly attached to the plate 59.

Similar bells 270, 280, 290 and 300, each identical to bell 260 and with identical hammers, hammer brackets, springs, shafts and heads are each similarly attached to plate 58.

Each of the bells 70, 80, 90, 100, 260, 270, 280, 290 and 300 have hammers, such as hammer 65 on bell 60, and each of the counters, as 71, 81, 91, 101 have movable arms such as arm 96 on counter 61: each of these hammers is provided with and is fully pivotally movable in a bell hammer arm slot similar to slot 65 for arm 63 and slot 265 for arm 263; each of the counter arms is provided with and is freely pivotally movable in a counter arm slot such as slot 66 in plate 59 for arm 63. The bells 70, 80, 90 and 100 and counters 71, 81, 91 and 101 are located relative to chambers 25, 30, 35 and 40 and the containers in such chambers in the same relationship as the bell 60 and counter 61 bear to chamber 20 and to plate 59 and to the containers as 107–114 in chamber 20.

The bell 260 and bell 60 are mounted relative to each other so that the hammer shaft 286 is, when horizontally extended, above shaft 86, when horizontally extended, a full integral multiple of the diameter of the cans, as 107–114, in the chamber 20 into which those hammer shafts project. In the preferred embodiment the shaft 286 is 12 inches above the level of shaft 86 when cans of 4-inch diameter are to be passed through chamber 20.

The support subassembly 19 comprises a pair of front legs 191 and 192 and a V-shaped rear leg 193. Legs 191 and 192 are each formed of 6" x 4" steel angles: each leg 191 and 192 is firmly attached at its top to the side and back of the guide group subassembly 11, as by screws and bolts as 221–230, the heads of which do not interfere with movement of cans through the chambers as 20, 25, 30, 35 or 40. The legs 191 and 192 are attached to the web and flange of the laterally exterior angles as 22 and 41 and the flange of the angles 21, 27, 36 and 42. The web and flanges are sufficiently thick so that countersinking the heads of the bolts permits that the containers as 107–114 pass freely through the chamber without interference therewith by such bolt heads.

Legs 191 and 192 are formed at their bottoms into U-shaped channels which support axles 196 and 197 on which, respectively, wheels 198 and 199 are rotatably mounted.

The V-shaped rear leg 193 is formed of a left branch leg 194 and a right branch leg 195. Each branch leg 194 and 195 is hingedly attached, as at hinge 189 for branch leg 194, to the rear back brace 45. Each leg branch portion as 194 is hingedly attached as by pivotal hinge 188 and hinge arms 184 and 185 to the corresponding front leg, as 192. The hinges as 189 are attached by bolts to the subassembly 11 and are detachable therefrom. Similarly, the bolts holding the legs 191 and 192 permit, if desired, detachment of the components of the support subassembly 19 from the subassembly 11.

The subassembly 11 is provided with a back cover 56. The back cover 56 is firmly yet detachably attached to the rear webs of the channels 21, 22, 26, 27, 31, 32, 36, 37, 41 and 42. The cover 56 is an imperforate flat opaque metal sheet which forms a smooth connection and seal with the aforesaid rear channel webs. It acoustically seals the rear of chambers 20, 25, 30, 35 and 40 and prevents pilferage of the containers from the rear of the chambers as 20, 25, 30, 35 and 40, as well as dropping of trash and accumulation of dirt and/or water therein; it may have slots as 156 at the top thereof opposite openings as 24. In operation the apparatus 10 is movable to any position desired in a service station for the most convenient location thereof in view of the contents to be dispensed by that particular apparatus.

While the apparatus 10 above described is specifically directed to oil can dispensing, it is not limited to cans of oil; it can, for instance, be used for any cylindrical container such as cylindrical containers for automotive hydraulic fluids, anti-freeze, paint, and also canned items packaged for human consumption as beer and soft drinks, and dog food cans.

The apparatus 10 with or without subassembly 19 may also be supported on a wall hook 200 in the vertical position as shown in FIGURE 2 showing the support subassembly 19 as detached from subassembly 11.

FIGURES 2, 6 and 8 show the position of a series of cylindrical containers 107, 108, 109, 110, 111, 112, 113 and 114 in position in chamber 20 when the components of apparatus 10 are in the container-holding disposition of its parts. The relation of the cams 107–114 to the subassembly 11 in the vertical orientation shown in FIGURES 2 and 6 are the same relation of parts and containers as when guide subassembly 11 is in the sloped position shown in FIGURE 4 except for that in FIGURES 4 and 7 and 9 the positions of the containers are shown during the dispensing of such containers, while in FIGURES 2, 6 and 8 the position of containers and bell hammer parts are shown in the container-holding disposition thereof.

In a particular embodiment of this invention the dimensions of the apparatus 10 are as given in Table I below.

In the operation of containing and dispensing the cans from chamber 20 of the apparatus 10 the bell hammer 63 is located initially, i.e., in the container-holding disposition of parts of apparatus 11, in the space 103 between adjacent cylindrical containers as 111 and 112, and hammer 263 is located initially, i.e., in the container-holding disposition of parts of apparatus 11, in the space 203 between adjacent cylinders as 109 and 108.

In the stage of holding, as distinguished from the stage of dispensing, cans from chamber 20 of apparatus 11, the relations of the bell hammers 63 and 263 and containers 107–114 are as follows:

(1) The relation of the shaft 85 of the arm 63, bell 60 and the center of the cans, as 111 and 112, is that a straight line drawn from end 92 to the center of can 111 passes above the lower edge 93 of the bell 60;

(2) A straight line passing from the rear end 92 of the shaft 85 toward the can 111 and crossing with the bell's lower edge 93 passes below the top of the slot 65; accordingly, there is no interference by the top of the slot 65 with the bell arm 63 operation;

(3) The length of the arm 63 is such that when the shaft 85 as shown in dotted lines 85' in FIGURE 8, contacts the lower edge 93 of the bell 60 at such time the hammer head 87 does not reach or touch the surface of upper can 111; i.e., there is a space 88 between the edge of the hammer head 87 and the surface of the can 111 which provides that the can will not provide any damping action on the ringing of the bell 60 by the shaft 85;

(4) The relation of the shaft 286 of the arm 263 of bell 260 and the center of the cans, as 108 and 109, is that a straight line drawn from end 292 of shaft 285 to the center of can 108 passes above the lower edge 293 of the bell 260;

(5) A straight line passing from the rear end 292 of the shaft 285 toward the can 108 and crossing the lower edge 293 passes below the top of the slot 265; accordingly, there is no interference by the top of the slot 265 with the bell arm 263 operation;

(6) The length of the arm 263 is such that when the shaft 286 contacts the lower edge 293 of the bell 260, as shown in dotted lines in FIGURE 6 as 285', the hammer head 287 does not reach or touch the upper can 108; i.e., there is a space 288 between the edge of the hammer head 287 and the surface of the can 108 which provides that cans as 108 will not provide any damping action on the ringing of the bell 260 by shaft 286; and (7) The arm 263 and head 287 lose contact with the can 108 in the chamber 20 and ring the bell 260 prior to the time at which the arm 63 and head 87 lose contact with can 111 and ring bell 60 when the cans 107–112 move downwardly through chamber 20.

The relations of the bells 70, 80, 90 and 100 and each of the ringing mechanisms therefor to the cans within chambers 25, 30, 35 and 40 are the same as described for the relations of bell 60 to the cans in chamber 20.

The relations of the bells 270, 280, 290 and 300 and each of the ringing mechanisms therefor to the cans within chambers 25, 30, 35 and 40 are the same as described for the relationship of bell 260 to the cans in chamber 20.

The relations between the bells 70 and 270, 80 and 280, 90 and 290, and 100 and 300 and the ringing mechanisms therefor are the same as above described for bells 60 and 260 and their ringing mechanisms.

In the operation of dispensing from the apparatus 10 when at least one can, as 108, is above the level of the upper bell hammer shaft 286, an operator, whose hand 140 is shown in FIGURE 4, removes the lowest can 114 and thereby lowers the cans 107–113. Thereupon the lower surface of the can 111, as shown in the full lines in FIGURE 9, engages the head 87 of the hammer 63 while the lower surface of can 108 engages head 287 only slightly later during the same step of lowering. Further downward motion of the can 111 to the intermediate position 211 shown in dotted lines in FIGURE 9 shown as 211 in FIGURE 7 moves the hammer head 87 downward and outward to the position shown as 220 and while can 108 moves the head 287 to position 240. Position 220 is the furthest downward displacement of the hammer head 87 but head 287 achieves its maximum lateral and downward displacement position at a slightly but distinctly earlier time in the same motion. Further downward motion of the can 111 from the position 211 shown in dotted lines in FIGURE 9, at which time the can 110 thereabove is moved downward to the position shown in dotted lines as 209, releases arms 63 and 263 and results, due to the resilient action of springs 92 and 292, in a resilient upward swinging of the shaft 286 as shown in FIGURE 7 and, shortly thereafter, shaft 86, toward the bell edges 293 and 93, respectively, and a ringing of said bells by said respective shafts. The bottom edges 93 and 293 of the bells 60 and 260 respectively are below a straight line which passes from the end 92 of shaft 85 and a straight line which passes from the end 292 for shaft 285, respectively, to the points at which the heads 87 and 287 of the hammers 63 and 263, respectively, might make their first contact with the bottom of cylinders 110 and 107 respectively; the bell 60 and bell 260 are accordingly each rung once. According to this invention bell 60 and bell 260 each provide a one-gong signal rather than provide a trembling ring.

Accordingly, by this invention, so long as there is at least one can above the level of the upper hammer shaft, 286, two separate gongs will be produced by the apparatus of this invention. When there are no cans above the upper bell hammer shaft 286 when cans are removed from the chamber 20, but there is a can above shaft 86 only one gong will be produced. This audibly indicates to the operator the condition of inventory in the apparatus 10 as being that condition of inventory wherein there are less than the minimum number of cans necessary to rise to the level of the upper bell hammer shaft but still a sufficient number of cans to be above the level of the lower bell hammer shaft 86. These distinctly different signals are provided for each of the three cans, as 109, 110, 111 as they move past arm 63 and provide to the operator a repeated audible signal and alarm, audible rather than requiring visual recognition, that not only are containers being taken from the dispenser 10, but also that refilling of such apparatus is required.

While it is within the scope of this invention that apparatus 10 may be used without baffles such as 69, 79, 89 and 99 which isolate chambers as 20, 25, 30, 35 and 40 from each other, it is desirable that such baffles be included and that undercoating also be applied to the inner surface of the back cover, front cover and the channels forming the falls of the chambers 20, 25, 30, 35 and 40 and that a downwardly open slot, as 156 in chamber 20, 166 in chamber 25, be placed at the top of the back cover in each of the chambers 20, 25, 30, 35 and 40 to increase the difference in sound from bells as 260 and 60 in each chamber as 20 when containers therein cease to block the upward passage of sound from the bells as 60 and 260. These baffles thus provide a distinct change in tone and volume as the last can located over passages as 158 passes therebelow when an operator, as 140, removes the lowest can in the series in that particular chamber, as 20, in addition to the above-discussed change in number of gongs as the level of cans falls below the level of bell arm 263 in chamber 20 and corresponding bell arms in chambers 25, 30, 35 and 40.

The relations of containers as 340 through 358 in the other chambers 20, 25, 30, 35 and 40 to bell hammers and bell hammer shafts for such other chambers corresponding to the bell hammers 63 and 263 and bell hammer shafts 86 and 286 for the other bells 60, 70, 80, 90, 100, 270, 280, 290 and 300 for such other chambers are as above described for the relations of the bell hammers 63 and 263 and shafts 86 and 286 to the containers as 107–114 within the chamber 20.

The front lip 146 of the bottom cover 49 is curved to fit the can 114. The cover 12 is located on and held to subassembly 11 by two locator pins 311 and 312, each firmly fixed to and projecting upwardly from the cover plate 46. These pins fit into 3/16-inch diameter holes 314 and 315 in the top flange 316 of cover plate 12. Two locator pins 321 and 322 each firmly fixed to and projecting upwardly from the front brace 48 fit into holes 324 and 325 provided therefor in the lower flange 326 of the cover plate 12. A lock 330 releasably holds cover 12 to a flange 331 firmly attached to channels 31 and 37. A Model 3705 Chicago Lock Company cam lock (Catalogue No. 163 of Chicago Lock Company, 2024 Racine Avenue, Chicago, Illinois) is used in the preferred embodiment hereinabove described.

The lengths of the bell hammer shafts 86 and 286 from their ends 92 and 292 are sufficiently great so that the hammer heads 87 and 287 will reach into the chamber 20 from their supports 84 and 284 to be moved by the containers passing therethrough.

The shaft 86 extends toward chamber 20 from its point of attachment at end 92 to the spring 85 no more than the difference between (a) the distance from end 92 of that shaft to the center axis of the can 112 and (b) the radius of can 112 below that arm so that the arm 63 may freely be released from its contact with the can 112 when the cans as 114, 113, 112 are in the container holding positions such as shown in FIGURES 1 and 2 and so provide an audible signal each time a container as 114 is removed from apparatus 10.

TABLE I

| Item | Characteristic, from/to | Measurement |
|---|---|---|
| 11 | Width 41/22 (outside) | 29 5/8″. |
|  | Height 51/46 | 60 7/8″. |
|  | Thickness (max.) 132/56 | 7 1/8″. |
|  | Thickness (min.) 120/56 | 4 3/16″. |
| 12, 56 | Sheet material, steel | 19 gauge. |
| 20 | Width, interior | 5 29/32″. |
| 21 | Width (flanges) | 1″. |
|  | Interior width of web | 41 1/32″. |
|  | Thickness of material | 3/64″. |
| 23 | Height 51/48 | 59/16″. |
|  | Depth 146/49 | 5 15/16″. |
| 24, 29, 34 | Opening, height 46/57 | 4 1/2″. |
| 48 | Angle, 16 gauge | 1″ x 1 3/64″. |
| 51 | Width | 3″. |
|  | Depth | 2 1/2″. |
| 59, 58 | Thickness | 16 gauge. |
|  | Height | 3 3/16″. |
| 260 and 60 | Diameter | 2 1/2″. |
|  | Depth | 3/4″. |
| 61 | Counter, Veeder-Root Series 1122 (4 digit) |  |
|  | Length | 2 25/64″. |
|  | Width | 1 7/16″. |
|  | Height | 1 9/32″. |
|  | Arm length | 1 1/2″. |
|  | Projection into chamber 20 | 3/8″. |
| 84 | Thickness | 20 gauge. |
| 85 | Length | 3/4″. |
|  | Stock, external diameter | 1/4″. |
|  | Force to depress head 87 by 1 inch | 3 oz. |
| 86 | Length 92/87 | 1 5/8″. |
|  | Projection into chamber 20 | 1/2″. |
|  | Thickness, diameter | #8 finish nail. |
| 86 to 286 | Spacing distance | 12″. |
| 109 | Diameter | 4″. |
|  | Length | 5 1/2″. |
|  | Capacity, quarts | 1.0. |
| 146 | Height 47/146 | 1″. |
|  | Curvature, radius of | 2 1/16″. |
|  | Material, steel | 19 gauge. |
| 314, 315 | Diameter | 3/16″. |

The shaft 286 for the bell 260 of the apparatus 10 is arranged to have a sufficiently different amount of inward projection, e.g., 1/16 inch to 3/16 inch, into the chamber 20 than does the shaft 86 so that the bells 60 and 260 will ring at close, but clearly distinguishable different moments. In the above-described embodiment the sleeve 75 is used at a lesser length than the sleeve 275 so that the upper bell 260 will ring before the lower bell 60. This relationship could be reversed so that the upper bell 260 rang later than the lower bell 60. The arrangement herein provided for 4-inch diameter cans is that the shaft 86 is 1 5/8 inches long and projects into the chamber 20 for 1/2 inch while the shaft 286 has the identical length but, inasmuch as the sleeve 275 is 1/8 inch longer than sleeve 75, the upper hammer head projects into chamber 20 only for 3/8 inch. Screws could be used to adjust the relative projections of upper and lower bell arms as 86 and 286 rather than sleeves.

It is within the scope of this invention that the counter and signal subassembly 18 may be on the rear of the guide subassembly 11 within an enclosure therefor similar to chamber 130 at the position 218 shown in dotted lines in FIGURE 4, rather than only in the front. It is also within the scope of this invention that the lower signalling subassembly comprising bar 59 and its associated bells and counter may be on the rear at the position shown in dashed lines, as 259′ on FIGURE 4, while the upper bell subassembly comprising the bar 58 and the bells 260, 270, 280, 290 and 300 associated therewith be on the front of the subassembly 11; this is in order to lessen the number of cans below the bell hammer arms, such as 63 and 73 and 83. However, it is preferred, for purposes of having a single, simply manufactured structure 11 which may be readily placed on a wall or on a wheel support to be moved to any desired position, that the bell support plates 58 and 59 and their associated hammers, bells and counters both be on the front side of the subassembly 11. It is also preferred that all the bells and hammers therefor on plate 58 be on the same horizontal level and of the same size and that all the bells and hammers therefor on plate 59 be on the same horizontal level and of the same size. The dimensions given for the embodiment above described are for an apparatus to contain the common, one quart cans which are each 5½ inches long and 4 inches in diameter. It is clearly within the scope of this invention that the dimensions may be varied to accommodate cans of different size.

The bells 260 and 60 are of the same size and shape. Thus, the sound from one dispensing apparatus, as 10, containing one type of oil will be readily differentiated from another similar dispenser provided with a different size bell and containing cans of anti-freeze or another type of oil; however, different combinations of bells may be used in the same apparatus 10.

The horizontal cross-section of cans as 111, 356, 357, 358, as shown in FIGURE 2, substantially completely fills the cross-section of the chambers 20, 30, 35 and 40 (chamber 25 being deliberately shown empty to facilitate description thereof). Accordingly, when the level of the to-be-dispensed containers falls below the opening of passage 158 from the chamber 130 between baffle plate 69 and plate 137 to chamber 20 above bell 260, as when can or container 107 moves from the level shown in FIGURE 6 to that shown in FIGURE 7 there is, when chamber 20 is acoustically sealed off from other chambers as 25, 30, 35, 40 and the walls of chamber 20 and the portion of the chamber 130 opening thereinto are insulated as by covering internally with a layer of automobile undercoating, a distinct increase in volume of sound from the bell, as 260, as well as a change in the number of gongs from two to one, when such critical level is reached.

In FIGURE 9 the full lines show in detail cans or containers 110, 111 and 112 in the same position as shown in FIGURE 4 when such cans or containers make their initial contact with the hammers as 63 and 263. In the dashed lines, FIGURE 9 shows, in detail, the relations when those same cans are moved somewhat further down to the position of maximum displacement of the hammer head 87, which relations are also shown in FIGURE 7 in solid lines. FIGURE 7 also shows the upper hammer 263 in a position slightly after it has reached its maximum lateral displacement and when it is about to be released to hit the bell edge 293 and produce a bell or gong-like sound. The relationships of the hammers and bells and downwardly moving cans are also shown in FIGURE 4 for both the arm 263 and arm 63 when those arms are each beginning to make their initial contact with the downwardly moving cans; FIGURE 7 shows a later stage in the same movement downward and the relative positions of arms 63 and 263 in that later stage.

Although in accordance with the provision of the patent statutes, particular preferred embodiments of this invention have been described and the principles of the invention have been described in the best mode in which it is now contemplated applying such principles, it will be understood that the operations, constructions and compositions shown and described are merely illustrative.

We claim:

1. A horizontally extending series of like vertically elongated mechanically enclosed neighboring guide chambers each comprising a front wall, a rear wall and side walls, each said chamber providing guide means for opposing sides and ends of each of a plurality of to-be-dispensed containers therein, each said guide chamber having, near its top, a forward-facing inlet opening, each said guide chamber having near its bottom a forward-facing discharge opening, each said guide chamber having a downwardly sloped bottom with an upwardly projecting lip defining said discharge opening, a removable opaque front cover attached to said guide chambers and forming at least a portion of the front walls thereof, two vertically spaced-apart sound-producing signalling means for each of said guide chambers and two of each such sound-producing signalling means attached to and operatively connected to one of said guide chambers, each of said two sound-producing signalling means being located within a portion of the front cover, a baffle between each of said chambers, said portion of said front cover with said baffle acoustically separating one of each of said guide chambers from its neighboring guide chamber, each said portion of said cover enclosing a space that is connected by an opening into one of said guide chambers, said two vertically spaced apart signalling means for each of said guide chambers comprising an upper and a lower signalling means, one sensing means separately attached to each one of said signalling means and sensitive to the movement of containers through one said guide chamber, said sensing means attached to the upper signalling means and said sensing means attached to the lower signalling means for each of said guide chambers being spaced apart by an integral multiple of the vertical distance through one of said containers and each said sensing means attached to the upper signalling means for each of said guide chambers having the same vertical level on each of said series of guide chambers and each of said sensing means attached to the lower signalling means for each of said guide chambers having the same vertical level on each of said series of guide chambers, and a counter means attached to each of said guide chambers and sensitive to movement of said to-be-dispensed containers therethrough.

2. Apparatus as in claim 1 wherein said spaced-apart signalling means produce sounds at audibly different times during the simultaneous motion of cans downward past the sensing means of both said upper and said lower signalling means through said guide chambers.

3. Apparatus as in claim 1 wherein said sensing means sensitive to the movement of said to-be-dispensed containers are rigid arms, one each attached to each of said signalling means and projecting into one of said guide chambers and said sensing arm of said upper signalling means and the sensing arm of said lower signalling means for each guide chamber project in different amounts into each said guide chamber.

4. Apparatus as in claim 3 comprising also a plurality of wheels attached to the bottom of said series of chambers and support means attached to the rear of said series of chambers.

5. A horizontally extending series of like vertically elongated container guides for each of a plurality of to-be-dispensed containers therein, each of said guides having near its top an inlet opening, each of said guides having near its bottom a discharge opening, each of said guides having a downwardly sloped bottom with an upwardly projecting lip defining said discharge opening, two vertically spaced-apart container sensing and signalling means for each of said guides, said sensing means for each of said guides being spaced apart a multiple of the vertical distance through one of said to-be-dispensed containers between said signalling means and each said signalling and sensing means being attached to one of said guides, said sensing means comprising means attached to each of said signalling means and sensitive to the movement of said containers through each of said guides and a counter means attached to each of said guides and sensitive to the movement of said to-be-dispensed containers through said guide.

6. Apparatus as in claim 5 wherein said means sensitive to the movement of said containers is a resiliently mounted arm for each of said signalling means and said arms project into one of said guides in different amounts for the sound-producing signalling means in said one guide and said spaced-apart signalling means producing sounds at audibly different times during the concurrent motion of containers downward through said guide past the sensing means of said both said spaced apart signalling means.

References Cited by the Examiner

UNITED STATES PATENTS

| | | | |
|---|---|---|---|
| 1,291,420 | 1/1919 | Cough | 312—45 X |
| 1,473,234 | 11/1923 | Johnson | 221—3 X |
| 1,592,720 | 7/1926 | Butler | 221—3 |
| 1,623,708 | 4/1927 | Seelman | 221—3 X |
| 1,712,080 | 5/1929 | Kelly | 221—3 X |
| 2,163,280 | 6/1939 | Hibshman | 221—3 X |
| 2,304,455 | 12/1942 | Guerard | 221—7 X |

FOREIGN PATENTS 730,141   5/1955   Great Britain.

ROBERT B. REEVES, *Primary Examiner.*

KENNETH N. LEIMER, *Examiner.*